United States Patent [19]
Sato et al.

[11] Patent Number: 6,038,354
[45] Date of Patent: Mar. 14, 2000

[54] OPTICAL MODULATOR HAVING A REFLECTION PLATE MOUNTED ON A REFLECTION END WITH AN INCLINED ANGLE AGAINST THE REFLECTION END

[75] Inventors: Ken Sato, Tsukuba; Haruhiko Tsuchiya, Higashimurayama, both of Japan

[73] Assignee: Tokin Corporation, Miyagi, Japan

[21] Appl. No.: 09/044,755

[22] Filed: Mar. 19, 1998

[30] Foreign Application Priority Data

Mar. 19, 1997 [JP] Japan ................................ 9-086107

[51] Int. Cl.$^7$ ............................. G02F 1/035; G02F 1/055
[52] U.S. Cl. .................................. 385/2; 385/3; 359/245; 359/247
[58] Field of Search ...................... 385/2, 3, 8; 359/245, 359/247

[56] References Cited

U.S. PATENT DOCUMENTS 5,278,499  1/1994  Ito et al. ............................. 324/244.1

FOREIGN PATENT DOCUMENTS 5-232417   9/1993   Japan .
5-249419  10/1993   Japan .
5-273260  10/1993   Japan .
9-054128   2/1997   Japan .

OTHER PUBLICATIONS

Patent Abstracts of Japan, vol. 018, No. 007 (P–1670), Jan. 7, 1994 & JP 05 249 419 A (Nippon Hoso Kyokai), Sep. 28, 1993.

Baranov D. V. et al: "Phase Bias Tuning and Extinction Ratio Improvement of Mach–Zehnder Interferometer" Integrated Optical Circuits, Boston, Sep. 3–4, 1991, No. 3, Ka Kha Wong, pp. 389–394.

Patent Abstracts of Japan, vol. 018, No. 048 (P–1682), Jan. 25, 1994 & JP 05 273260 A (Yokogawa Electric Corp.), Oct. 22, 1993.

*Primary Examiner*—Georgia Epps
*Assistant Examiner*—Margaret Burke
*Attorney, Agent, or Firm*—Frishauf, Holtz, Goodman, Langer & Chick, P.C.

[57] ABSTRACT

An optical modulator (39) includes a substrate (7) exhibiting an electro-optical Pockels effect and having first and second end surfaces (31, 33) opposite to each other. An optical waveguide (9) of a branched interferometer type is formed on the substrate (7) and has first and second branched waveguide portions (11, 13) with an input end and a reflection side end respectively exposed in the first and second end surfaces (31, 33) of the substrate (7). A modulating electrode (15) is formed on the substrate (7) in a vicinity of the branched interferometer type optical waveguide (9). A reflection plate (35) is mounted on the second end surface (33) of the substrate (7) at an angle of inclination ($\theta$) with respect thereto. Still further, a spacer (41) is disposed between a side of the reflection plate (35) and the second end surface (33) of the substrate (7) to thereby define the angle of inclination ($\theta$) of the reflection plate (35) with respect to the second end surface (33) of the substrate (7).

9 Claims, 2 Drawing Sheets

OPTICAL MODULATOR HAVING A REFLECTION PLATE MOUNTED ON A REFLECTION END WITH AN INCLINED ANGLE AGAINST THE REFLECTION END

BACKGROUND OF THE INVENTION

This invention relates to an optical modulator using a waveguide formed on a substrate exhibiting the electro-optical Pockels effect.

U.S. Pat. No. 5,278,499 and JP-A-5 273260, disclose an the optical modulator which is used in a device such as a modulator or a device for optically measuring an electromagnetic field intensity, and which and utilizes a substrate of an electro-optic crystal such as $LiNbO_3$ or the like. In detail, a waveguide of a branched interferometer type is formed by Ti thermal diffusion on the surface of the substrate. The waveguide has an incident end at an end surface of the substrate, extending to the opposite end surface of the substrate with two branched waveguide portions branched at a branched point and exposing their ends at the opposite end surface. Modulating electrodes are formed on the surface of the substrate in the vicinity of the waveguide, and a light reflecting plate is fixedly mounted on the opposite end surface of the substrate by use of an adhering agent of, for example, an ultraviolet curing type.

In the optical modulator, a light beam is incident into the incident end of the waveguide at the end surface of the modulator and propagates in the waveguide. The light beam is split at the branched point into split beams which, in turn, propagate through branched waveguide portions and then is reflected as reflected light beams by the reflecting plate. The reflected light beams propagate backward in the branched waveguide portions and are combined at the branched portion, then outgoing as an output light from the incident end. It will be noted that the incident end is also used as a light outgoing end. The intensity of the output light beam is changed by application of a voltage to the modulating electrode. The intensity change is dependent on a trigonometric function of the voltage applied and has the maximum and the minimum.

The optical modulator has an optical bias point which is determined as an intensity of the output light when the applied voltage is zero. The optical bias point is present at the maximum point of a trigonometric function curve of the output light intensity change if the optical modulator could be formed in a geometrically symmetric form.

The optical modulator is required to have its optical bias point adjusted at a middle point on a linear portion between the maximum and the minimum of the intensity change of the output light. Thus, the light beam is linearly modulated by the voltage applied. On the contrary, when the optical bias point is offset from the middle point towards the maximum or the minimum, the intensity modulation linearity and sensitivity are degraded.

Since it is very difficult to adjust the optical bias point by processes for producing the optical modulator without high production accuracy, the production yield is very low.

SUMMARY OF THE INVENTION

It is an object of this invention to provide an optical modulator whose optical bias point is easy to adjust and which therefore has excellent intensity modulation linearity and sensitivity.

According to this invention, there is provided an optical modulator comprising a substrate exhibiting an electro-optical Pockels effect and having a first and a second end surfaces opposite to each other, an optical waveguide of a branched interferometer type formed on the substrate and having a first and a second branched waveguide portions with an input end and a reflection side end exposed in said first and second end surfaces respectively, a modulating electrode formed on the substrate in the vicinity of the branched interferometer type optical waveguide, and a reflection plate mounted on the second end surface, wherein the reflection plate has an inclination against the second end surface of the substrate.

The optical modulator may preferably further comprise a spacer disposed between a side of said reflection plate and said second end surface of said substrate to thereby form said inclination and a space between said second end surface and said reflection plate.

In the optical modulator, the space is preferably filled with an adhesive to adhere the second end surface, the reflection plate and the spacer to each other.

DESCRIPTION OF PREFERRED EMBODIMENTS

Prior to description of preferred embodiments of this invention, description will be made as to a known optical modulator illustrated in FIG. 1 in order to support the better understanding of this invention.

Figure 1:
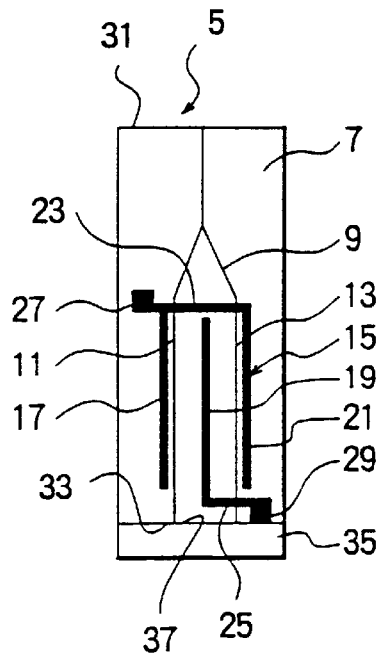
FIG. 1 is a schematic plan view of a known optical modulator.

Referring to FIG. 1, the known optical modulator 5 comprises a lithium niobate ($LiNbO_3$) substrate 7 on which a waveguide 9 of a branched interferometer type is formed by Ti thermal diffusion. The branched interferometer type waveguide has two first and second branched waveguide portions 11 and 13. On the substrate 7, a modulating electrode 15 is formed in the vicinity of the waveguide 9 and comprises first, second and third longitudinal electrode portions 17, 19 and 21 extending in parallel with the waveguide 9, a first lateral electrode portion 23 extending from one side toward the opposite side of the substrate 7 and in a direction perpendicular to the first and third longitudinal electrode portions 17 and 21 and connected to an end of each of the first and third longitudinal electrode portions 17 and 21, and a second lateral electrode portion 25 extending from the opposite side toward the one side of the substrate and in a direction perpendicular to the longitudinal second electrode portion 19 and connected to an opposite end of the second longitudinal electrode portion 19. Terminal pads 27 and 29 are formed at the terminal ends of the first and the second lateral electrode portions 23 and 25 at opposite sides of the substrate 7, respectively.

The substrate 7 has a light incident side end 31 and a reflection side end surface 33 opposite to the light incident side end surface 31. On the reflection side end surface 33, a light reflection plate 35 having a reflecting surface 37 is adhered by, for example, an ultraviolet light curing adhesive agent. The intensity of the output light is measured by a light intensity detector (not shown) connected to an end of the waveguide 9.

In the known optical modulator 5, when a light beam or a laser propagates in the waveguide 9, its intensity is changed depending on a trigonometric function by an electric field due to a voltage applied to the modulating electrode 15, as is represented by:

$$P_{out} = \alpha P_{in}\{1+\cos(V1\cdot\pi/V\pi+\phi)\}/2 \qquad (1)$$

where Pout is output light intensity, Pin being incident light intensity, Vπ being a voltage corresponding to a half period of the output light intensity change depending on the trigonometric function of the applied voltage (which will be referred to as "½ wavelngth voltage"), α being a light loss factor, V1 being the applied voltage, and φ being a phase angle of the optical bias point shifted from the maximum point when the applied voltage is zero.

The known optical modulator 5 of FIG. 1 was produced by forming a pattern of Ti film with 40–100 nm thickness on a lithium niobate substrate 7 which was cut out in a direction perpendicular to the X crystal axis, performing the Ti diffusion at a temperature of 1,000–1,100° C. for 4–10 hours to form the waveguide 9, and forming a metallic pattern of the modulating electrode 15 in the vicinity of the branched waveguide portions 11 and 13. Then, the light injection end surface 31 and the reflection side end surface 33 of the substrate 7 were polished into a mirror surface. On the reflection side end surface 33, there was fixedly mounted a reflection plate 35 which comprises a glass plate coated with a metallic coating such as gold. The produced optical modulator of the known type had a width (w) of 6 mm, with a distance of 36 μm between the branched waveguide portions. The produced optical modulator 5 was measured in a characteristic of the output light responsive to the voltage applied. The measured characteristic is shown at a dotted line 43 in FIG. 3.

Figure 3:
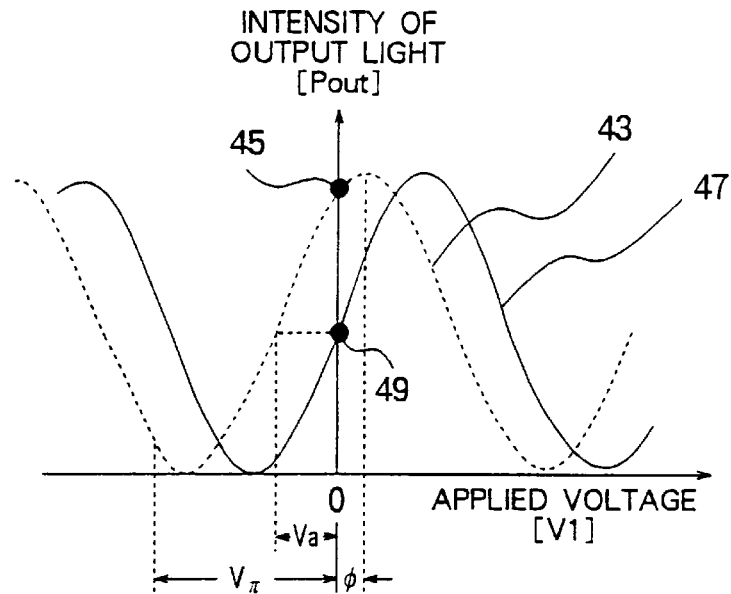
FIG. 3 is a graph showing a modulated intensity curve in the optical modulator of FIG. 2 in comparison with that in the optical modulator of FIG. 1.

Referring to FIG. 3, the known optical modulator has an optical bias point 45 at a position close to the maximum of the output light intensity curve 43 and Vπ=5 V.

The known optical modulator however has the problems as described in the Background of the Invention.

Now, description will be made as to an embodiment of this invention with reference to FIGS. 2 and 3.

Figure 2:
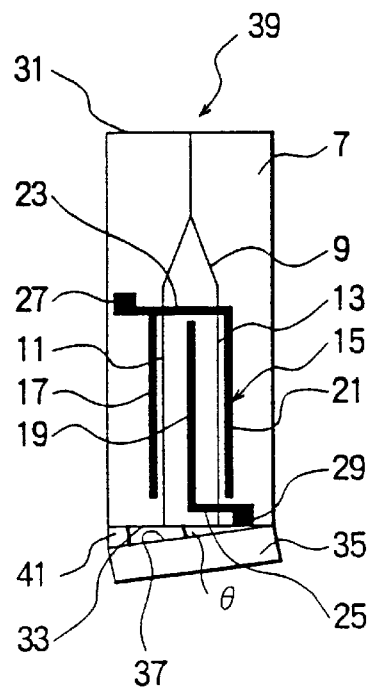
FIG. 2 is a schematic plan view of an optical modulator according to a first embodiment of this invention.

Referring to FIG. 2, the optical modulator 39 shown, therein comprises a substrate 7 of lithium niobate on which a branched interferometer type waveguide 9 is formed by Ti thermal diffusion, and a modulating electrode 15 disposed in the vicinity of the waveguide 9 in the similar arrangement to the known opptical modulator. A light intensity detector (not shown) is also connected to an end of the waveguide 9 so as to measure the intensity of an output light therefrom.

The optical modulator 39 is different from the known optical modulator in that a reflection plate 35 having a light reflection face 37 is mounted on a light reflection side end 33 of the substrate 7 through a spacer 41 by which the reflection side end surface 33 and the light reflection face 37 make an angle θ therebetween.

The substrate 7, the reflection plate 23, and the spacer 41 are fixed to each other by an adhesive agent such as an ultraviolet curing adhesive agent. It is preferable that the adhesive agent is filled in a space defined by the substrate 7, the reflection plate 23, and the spacer 41.

In detail, the spacer 41 is disposed between a side of the reflection side end surface 33 and a corresponding side of the light reflection face 37 and has a thickness d so as to make the angle θ. The thickness d is given by the following equation:

$$d = (V_a/V\pi)^*(\lambda/4n)^*(w/L) \qquad (2)$$

where Va is an applied voltage required to shift the phase angle to the middle point when θ=0, λ being a wavelength of the light, n being a refractive index of the adhesive agent, L being a distance between the branched waveguide portions, and w being a width of the substrate. The adhesive agent is preferably one having refractive index similar to the waveguide 9, for example, n=1.48.

In the optical modulator 39, the split beams passing through the branched waveguide portions 11 and 13 are emitted from the substrate 7 and reflected as the reflected light beams by the light reflection face 37 into the branched waveguide portions 11 and 13. The reflected light beams propagate backward in the branched waveguide portions 11 and 13 and then combined into a combined light beam at the branched point, which is emitted as the output light. Due to the inclination angle θ of the light reflection face 37, there is a difference of $(V_a/V\pi)^*(\lambda/2n)$ between optical paths for the split beams passing through the branched waveguide portions to the light reflection face 37. Therefore, the combined light beam has an intensity corresponding to the middle point between the maximum and the minimum when the applied voltage is zero. That is, the optical bias point is adjusted to the middle point.

Now, the optical modulator of FIG. 2 will be described in connection with its production method and its modulation characteristic.

An optical modulator shown in FIG. 2 according to a first embodiment of this invention was produced in the producing manner similar to the known modulator of FIG. 1 as described above. After the reflection side end surface 33 of the substrate 7 was polished, a reflection plate 35 was fixedly mounted on the reflection side end surface 33 with a spacer 41 of a thickness of 15 μm being disposed between a side portion of the reflection plate 35 and the reflection side end surface 33 so that the reflection plate 35 is inclined against the reflection side end surface 33. The optical adhesive agent is filled within a space defined by the reflection side end surface 33, the reflection surface 37 and the spacer 41. The thickness of the spacer 41 was selected to adjust the bias point into the optimum point as determined by equation (2) described above.

With respect to the optical modulator 39 as produced, a characteristic of the output light responsive to the voltage applied was measured and is shown in FIG. 3.

Referring to FIG. 3, the optical modulator 39 of the present invention has a bias point 49 at a middle point between the maximum and the minimum of a light intensity curve 47 responsive to the applied voltage variation.

Figure 4:
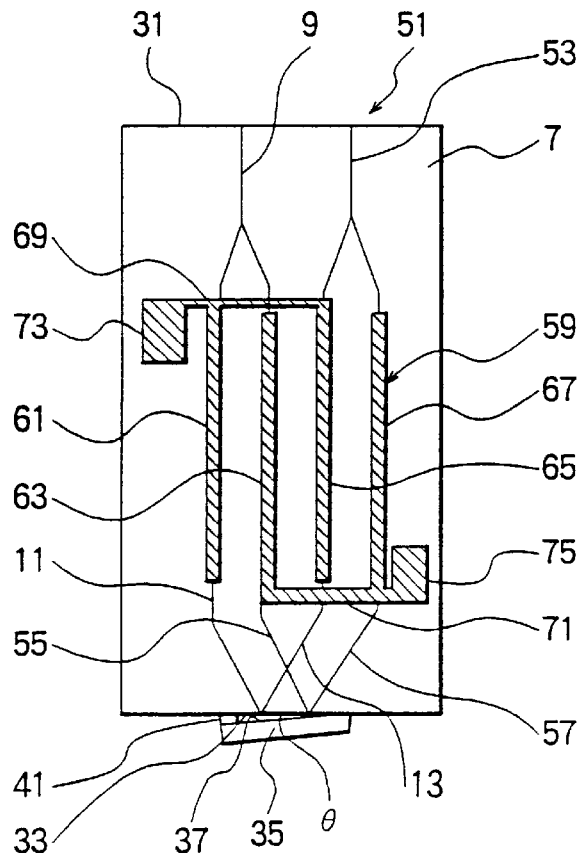
FIG. 4 is a schematic plan view of an optical modulator according to a second embodiment of this invention.

Referring to FIG. 4, an optical modulator 31 according to a second embodiment of this invention shown therein comprises a titanium niobate substrate 7 on which a pair of waveguides 9 and 53 of a branched interferometer type is formed by Ti thermal diffusion. The waveguide 9 has first and second branched waveguide portions 11 and 55 and the other waveguide 53 has also has first and second branched waveguide portions 13 and 57 which are connected to the branched first and second waveguide portions 11 and 55, respectively, at the reflection side end surface 33. A modulating electrode 59 is formed in the vicinity of the branched waveguide portions 11, 55, 13 and 57. The modulating electrode 59 comprises first through fourth longitudinal electrode portions 61, 63, 65 and 67 extending along and over the branched waveguide portions 11,55, 13 and 57, respectively. The modulating electrode 59 has a first lateral electrode portion 69 which extends from one side of the substrate toward the other side in a direction perpendicular to the longitudinal electrode portions and is connected to one ends of the first and third electrode portions 61 and 65. The modulating electrode 59 further has a second lateral electrode portion 71 which extends toward the one side of the substrate from the other side in a direction perpendicular to the longitudinal electrode portions and is connected to the opposite ends of the second and fourth electrode portions 63 and 67. Terminal pads 73 and 75 are formed at a terminal end of the first lateral electrode portion 69 at the one side of the substrate 7 and at a terminal end of the second lateral electrode portion 71 at the other side, respectively.

A reflection plate 35 having a light reflection face 37 is also fixedly mounted on a reflection side end surface 33 of the substrate 7 by means of an adhesive agent such as an ultraviolet curing adhesive with a spacer 41 held between the light reflection face 37 and the reflection side end surface 33 to thereby form an inclination angle θ of the light reflection face 37 against the reflection side end surface 33. The inclination angle θ is also determined by d according to equation (2).

In the above mentioned embodiments, the substrate 7 has been described as being made of lithium niobate. However, the substrate can be made of any other material having the electro-optical Pockels effect, such as, lithium tantalate, PLZT, GaBs, and InP. As a method for forming the waveguide, moreover, the epitaxial growth method or the proton exchange method can be used in place of Ti thermal diffusion.

Still further, the spacer can be made of any insulatable material having the thickness d, and is preferably made of alumina.

What is claimed is:

1. An optical modulator comprising:

a substrate exhibiting an electro-optical Pockels effect and having first and second end surfaces opposite to each other, an optical waveguide of a branched interferometer type formed on said substrate and having first and second branched waveguide portions with an input end and a reflection side end respectively exposed in said first and second end surfaces of said substrate, a modulating electrode formed on said substrate in a vicinity of said branched interferometer type optical waveguide, p1 reflection plate mounted on said second end surface of said substrate at an angle of inclination with respect thereto, and a spacer disposed between a side of said reflection plate and said second end surface of said substrate to thereby define the angle of inclination of said reflection plate with respect to said second end surface of said substrate.

2. The optical modulator as claimed in claim 1, wherein said spacer forms a space between said second end surface of said substrate and said reflection plate.

3. The optical modulator as claimed in claim 2, wherein said space is filled with an adhesive to adhere said second end surface of said substrate, said reflection plate and said spacer to each other.

4. The optical modulator as claimed in claim 3, wherein said modulating electrode extends along and partially over said first and second branched waveguide portions of said branched interferometer type optical waveguide.

5. The optical modulator as claimed in claim 4, wherein a pair of branched interferometer type optical waveguides are formed in parallel with each other on said substrate, each of said pair of interferometer type optical waveguides having first and second waveguide portions, with ends of said first branched waveguide portions of said pair of interferometer type optical waveguides being connected to each other at said second end surface of said substrate, and with ends of said second branched waveguide portions of said pair of interferometer type optical waveguides also being connected to each other at said second end surface.

6. The optical modulator as claimed in claim 1, wherein said substrate is made of one of lithium niobate, lithium tantalate, PLZT, and GaAs.

7. The optical modulator as claimed in claim 6, wherein said branched interferometer type optical waveguide is formed by one of a metallic thermal diffusion method, an epitaxial growth method, and a proton exchange method.

8. The optical modulator as claimed in claim 7, wherein said substrate is made of lithium niobate.

9. The optical modulator as claimed in claim 8, wherein said branched interferometer type optical waveguide is formed by Ti thermal diffusion.

* * * * *